United States Patent [19]

Mills

[11] 4,373,408
[45] Feb. 15, 1983

[54] VARIABLE RATIO FLUID-MECHANICAL DRIVE APPARATUS

[75] Inventor: Ned D. Mills, West Richland, Wash.

[73] Assignee: Varitran, Inc., Richland, Wash.

[21] Appl. No.: 160,014

[22] Filed: Jun. 16, 1980

[51] Int. Cl.³ .............................................. F16H 47/04
[52] U.S. Cl. ...................................... 74/687; 74/677; 74/681
[58] Field of Search ................ 74/677, 679, 681, 687, 74/785

[56] References Cited

U.S. PATENT DOCUMENTS

| Re. 27,307 | 3/1972 | De Lalio | 74/687 |
|---|---|---|---|
| 2,296,929 | 9/1942 | Ifield | 74/687 X |
| 3,052,098 | 9/1962 | Ebert | 74/687 X |
| 3,054,263 | 9/1962 | Budzich et al. | 74/687 |
| 3,396,607 | 8/1968 | Ross | 74/687 |
| 3,442,153 | 5/1969 | Ross | 74/687 |
| 3,455,184 | 7/1969 | Frandsen et al. | 74/687 |
| 3,488,947 | 1/1970 | Miller et al. | 74/687 X |
| 3,735,646 | 5/1973 | Roberts | 74/687 |
| 3,924,490 | 12/1975 | Mills | 74/752 E |
| 3,969,957 | 7/1976 | De Lalio | 74/687 |
| 3,979,972 | 9/1976 | Sakai et al. | 74/687 |
| 4,046,029 | 9/1977 | Sugden | 74/687 |
| 4,286,480 | 9/1981 | Dickie | 74/785 |

FOREIGN PATENT DOCUMENTS

| 1500385 | 6/1969 | Fed. Rep. of Germany | 74/687 |
|---|---|---|---|
| 1918954 | 10/1970 | Fed. Rep. of Germany | 74/677 |
| 1951233 | 4/1971 | Fed. Rep. of Germany | 74/687 |
| 1032435 | 6/1966 | United Kingdom | 74/687 |
| 1217862 | 12/1970 | United Kingdom | 74/687 |
| 1222515 | 2/1971 | United Kingdom | 74/687 |

*Primary Examiner*—Leslie A. Braun
*Assistant Examiner*—Laron D. Shannon, III
*Attorney, Agent, or Firm*—Wells, St. John & Roberts

[57] ABSTRACT

A variable ratio fluid-mechanical variable ratio drive apparatus (10) is described utilizing an axial piston, variable positive displacement pump (22), an axial piston, variable positive displacement motor (24); and an intermediate planetary gear set (16). The apparatus has an input drive shaft (35) connected to planetary gear carrier (20) for driving the planetary gear set. The pump (22) has a shaft (54) mounted coaxial to the input drive shaft (35) and is connected to a sun gear (21) to control the rotational speed of the sun gear (21). The apparatus has an output shaft (143) operatively connectable to a planetary ring gear member (18). The motor (24) is mounted coaxial and operatively connected to the output shaft for transferring torque therebetween. The pump (22) and the motor (24) are hydraulically interconnected to transfer fluid therebetween. A clutch means (28) is provided operatively intermediate the planetary gear set and the output shaft to mechanically interconnect and disconnect the output shaft (143) from the ring gear member (18). Both the pump (22) and the motor (24) have opposed piston cavity barrels (76, 77) mounted about the input and output shafts (35, 143) respectively. A plurality of angularly spaced double ended piston rods (64) having pistons (72, 73) on the ends thereof project into cavities (79) formed in the barrels (76, 77). The piston rods (64) and pistons (72, 73) are held axially stationary. The barrels (76, 77) are supported for rotation about the shaft axis and are supported for pivotal movement about tilt axes by barrel carriers (92, 93, 184, 185) to vary the angular orientation of the barrels to vary the fluid displacement of the pump 22 and/or the motor 24.

12 Claims, 15 Drawing Figures

VARIABLE RATIO FLUID-MECHANICAL DRIVE APPARATUS

TECHNICAL FIELD

This invention relates to fluid-mechanical variable ratio drive units utilizing a fluid pump, a fluid motor and an intermediate planetary gear set.

BACKGROUND OF THE INVENTION

Fluid-mechanical drive units of variable speed ratios have been utilized for many application; however in most applications it has been very difficult to obtain a large torque output at very low output speeds. A further objection with most transmissions of this type is their excessive weight to displacement ratio and their inability to operate at high speeds. Further disadvantages usually involve the inability to operate efficiently over extremely wide ranges of speed ratios, particularly in overcoming starting inertia. Furthermore, such transmissions have usually involved the use of frictional bands which enhance contamination of the hydraulic system which is extremely detrimental to the life of such drive units. A further disadvantage has been the inability to provide a straight line input-output shaft in a very small compact housing that has a very high initial torque capability.

U.S. Pat. No. 3,924,490 granted to Ned D. Mills on Dec. 9, 1975 describes a power transmission speed control apparatus utilizing the hydraulic gear pump, a planetary gear set and a positive displacement hydraulic motor. However, such drive unit is rather complicated and was unable to deliver the high torque requirements at the starting or zero output speed to quickly and efficiently overcome the initial inertia of the load.

One of the principal objects of this invention is to provide a variable ratio fluid-mechanical drive unit that is capable of providing a very high torque output at very low speeds with very high efficiencies over an almost infinite speed ratio from zero to the maximum ratio of the planetary gear set.

A further object of this invention provides a very small, high speed fluid-mechanical drive unit that has a high volumetric displacement to weight ratio.

A further object of this invention is to provide a very small variable ratio fluid-mechanical drive unit that have coaxial input and output shafts in a relatively small housing with a very high fluid displacement to weight ratio.

Further objects of this invention will become apparent upon reading the following detailed description of a preferred embodiment.

BRIEF DESCRIPTION OF THE DRAWINGS

A preferred embodiment of this invention is illustrated in the accompanying drawings, in which:

FIGS. 1A and 1B are vertical cross-sectional longitudinal views of a variable ratio fluid-mechanical drive unit which is the subject of the present invention illustrating an axial piston, variable positive displacement fluid pump, a planetary gear set and an axial piston, variable positive displacement fluid motor as major components;

DETAILED DESCRIPTION OF A PREFERRED EMBODIMENT

Figure 1:
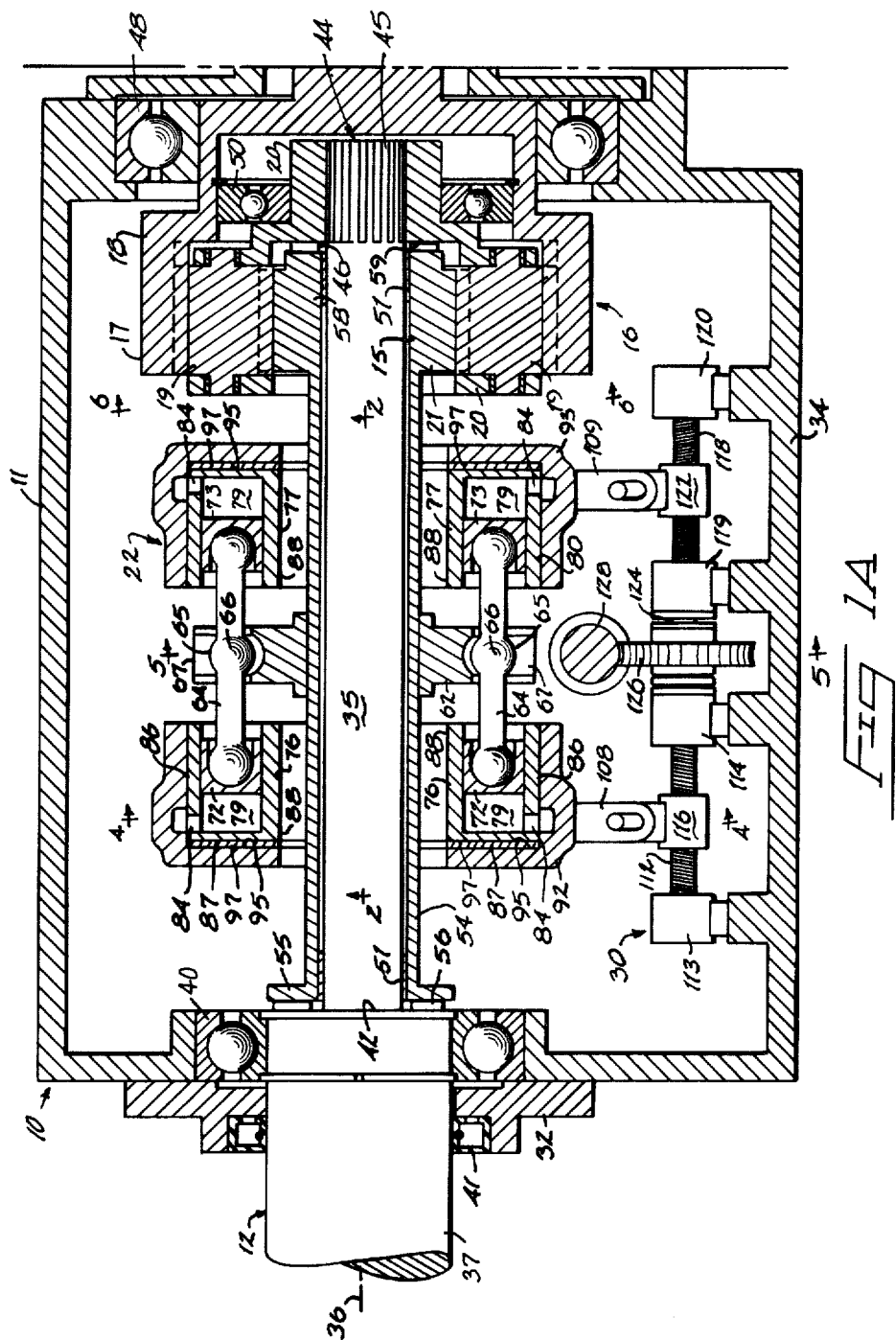
FIG. 1 is a legend for FIGS. 1A and 1B.

Referring now in detail to the drawings, there is illustrated in FIGS. 1A and 1B a variable ratio fluid-mechanical drive apparatus generally designated with the numeral 10 having an elongated housing 11 with a power input drive means 12 and a power output drive means 14 with an almost infinite speed ratio between the power input drive means and the power output drive means 14.

Figure 6:
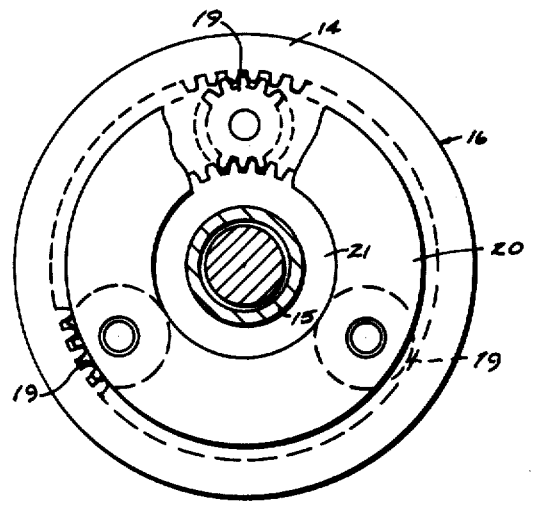
FIG. 6 is a sectional view taken along line 6—6 in FIG. 1A illustrating the planetary gear set.

The drive apparatus 10 includes a planetary gear set 16 (FIGS. 1A and 6) which includes a ring or annular gear 17 that is mounted on a ring gear member 18. The planetary gear set 16 includes a set of planetary gears 19 supported on a planetary gear carrier member 20. A sun gear 21 is mounted on a sun gear member 15. The planetary gears 19 intermesh with the ring gear 17 and the sun gear 21.

Figure 2:
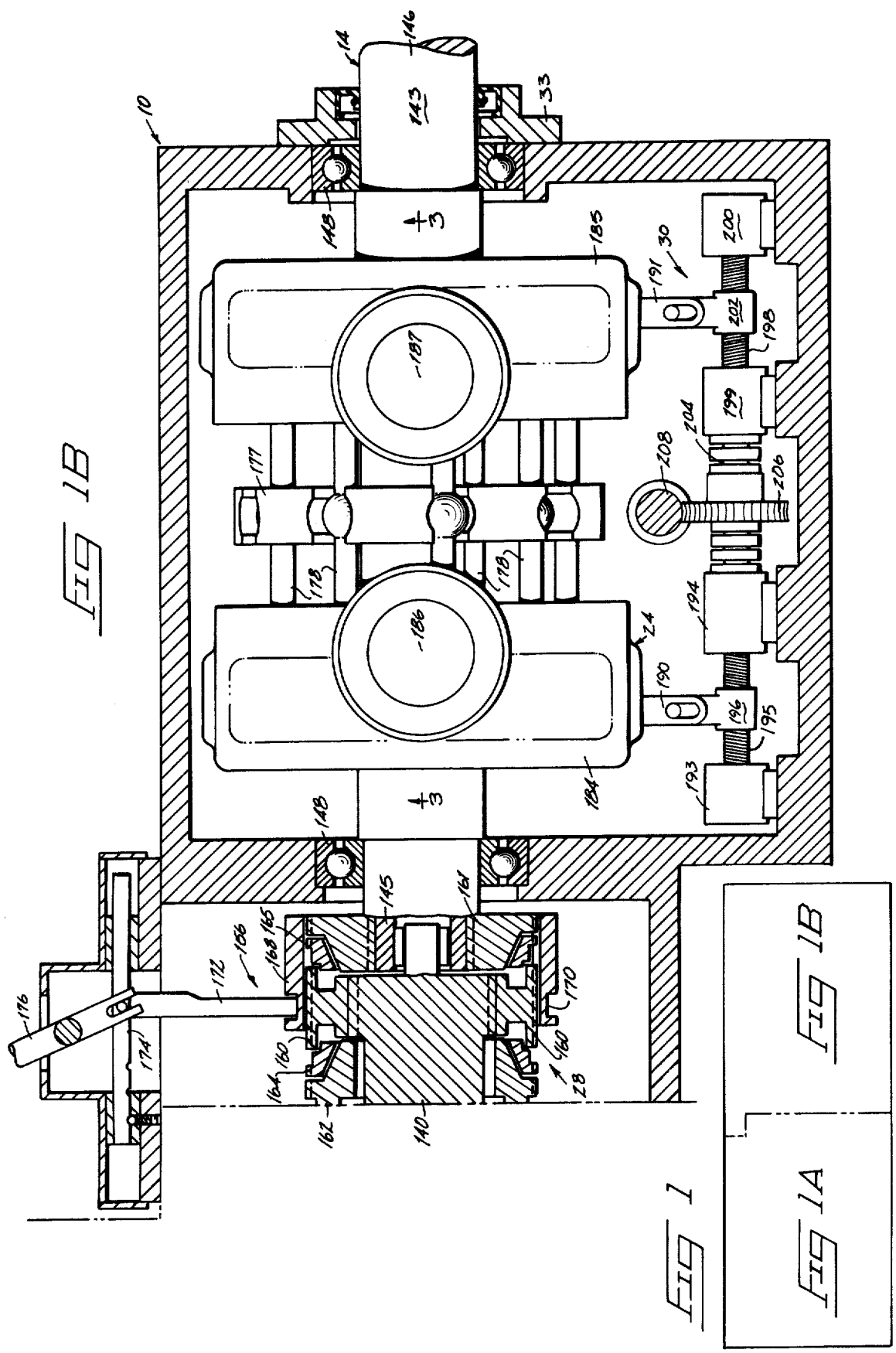
FIG. 2 is a cross-sectional view taken along line 2—2 in FIG. 1A illustrating additional details of the axial piston, variable positive displacement fluid pump.
Figure 3:
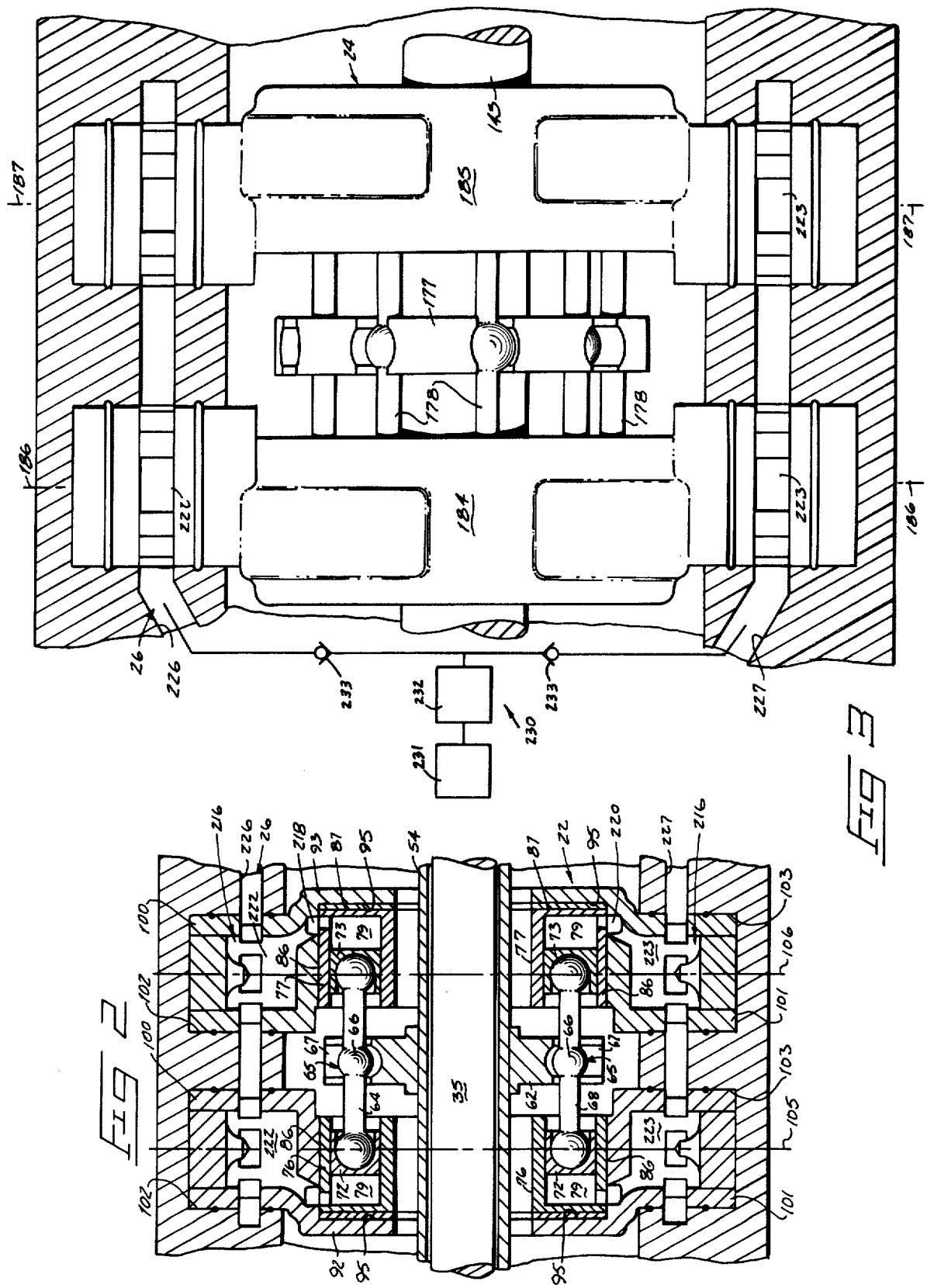
FIG. 3 is a cross-sectional view taken along line 3—3 in FIG. 1B illustrating additional details of the axial piston variable fluid motor.

The drive apparatus 10 includes an axial piston variable positive displacement fluid pump 22 (FIGS. 1A and 2) that is operatively connected to the sun gear member 15 for varying the rotational speed of the sun gear 21. The drive apparatus 10 further includes an axial piston, variable positive displacement fluid motor 24 (FIGS. 1B and 3) that is operatively connected to power output drive means 15 for transferring torque between the power output drive means 15 and the motor 24.

The drive apparatus 10 includes a fluid interconnecting means 26 (FIGS. 2 and 3) that operatively interconnects the pump 22 and the motor 24 to transfer fluid between the pump 22 and motor 24.

The drive apparatus 10 includes a clutch means 28 (FIG. 1B) interposed between the planetary gear set 16 and the power output drive means 14 for changing the drive modes of the drive apparatus. For convenience of discussion, clutch means 28 is capable of placing the drive apparatus 10 in one of three operational modes—(1) forward drive; (2) a neutral position; and (3) reverse drive.

The drive apparatus 10 further includes a pump and motor control means 30 (FIGS. 1A, 1B and 5) operatively connected to the pump 22 and the motor 24 for controlling the fluid displacement of the pump 22 and the motor 24 to vary the speed ratio between the power input drive means 12 and the power output drive means 14.

The housing 11 is elongated and extends from an input end 32 (FIG. 1A) to an output end 33 with a housing wall 34 extending therebetween.

The power input drive means 12 includes an input shaft 35 that extends along a central axis 36 of the drive unit. The shaft 35 extends from an end 37 that projects from the input end 33 to an opposite end 44. The end 37 is supported for rotation by thrust bearing 40. A seal 41 is provided to prevent loss of lubricating liquid from the housing end 32. The shaft end 37 further includes a shoulder 42.

The opposite end 44 of the input shaft 5 is provided with a spline 45 (FIG. 1A) that is operatively connected to a corresponding spline member on the planetary carrier member 20. The planetary gear carrier member 20 includes a shoulder 46 that opposes the shoulder 42. Rotation of the input shaft 35 in turn rotates the planetary carrier member 20 to drive the planetary gear set 16.

The ring gear member 18 is supported by a thrust bearing 48 illustrated in FIG. 1A with respect to the housing 11. A second thrust bearing 50 is provided between the ring gear member 18 and planetary carrier member 20 to permit one to rotate with respect to the other.

The axial piston variable positive displacement fluid pump 22 includes a hollow shaft 54 that is mounted coaxially about the input shaft 35 extending between end 55 and end 58. The end 58 is formed integrally or is connected to the sun gear 21 so that the sun gear 21 and the pump shaft 54 rotate together. In the forward drive mode, the hollow shaft 54 will rotate in the same rotational direction with respect to the input shaft 35. Thrust roller bearings 56 and 59 are provided at opposite ends of the hollow shaft 54 for engaging the shoulders 42 and 46 respectively to hold the shaft 54 axially stationary with respect to the input shaft 35. The hollow shaft 54 is supported for rotation about the input shaft 35 by bushings 51.

The pump 22 includes a piston rod support member 62 (FIGS. 1A, 2 and 5) that is affixed to the hollow shaft 54 and extends radially outward somewhat like a sprocket for supporting a plurality of double ended piston rods 64 at radially and angularly spaced positions about the shaft 54. The shaft 54 has a pump axis that is coincident with the input shaft 35. Each of the piston rods 64 include an enlarged central section 65 that cooperates with the piston rod support 62 to prevent the piston rod 64 from moving axially with respect to the shaft 54. However, the central section 65 is permitted to move slightly radially and circumferentially with respect to the shaft 54 to accommodate eccentricities in the movement of the piston rods about the pump axis.

In a preferred embodiment, the central section 65 includes ball and socket arrangement with a ball 66 formed intermediate the piston rod ends for fitting within a complementary elongated socket 67 formed in the periphery of the piston rod support 62. Each of the piston rods 64 extend between piston ends with piston ends 72 and 73 mounted for universal movement on the piston ends. The pistons 72 and 73 may be referred to as being mounted axially stationary with respect to the pump shaft 54.

Figure 4:
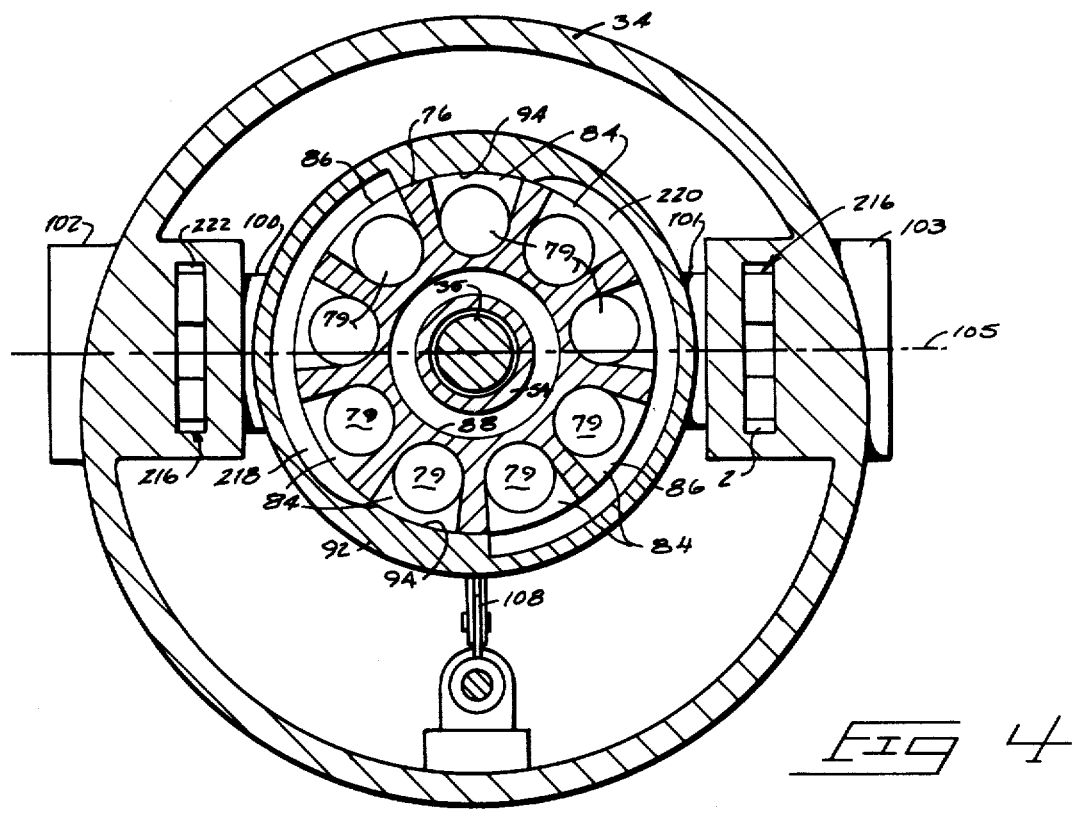
FIG. 4 is a transverse cross-sectional view taken along line 4—4 in FIG. 1A illustrating additional details of the fluid pump.

The pump 22 further includes annular piston cavity barrels 76 and 77 that are mounted circumscribing the shaft 54 adjacent the piston 72 and 73 respectively. Each of the annular piston cavity barrels 76, 77 includes a plurality of piston cavities 79 formed therein to receive the pistons 72 and 73. Each of the piston cavities 79 includes a cavity cylindrical wall and a cavity end wall. The fluid, preferably hydraulic liquid, is compressed between the pistons 72, 73 and the cavity end walls. Fluid ports 84 (FIGS. 1A, 2 and 4) are formed in the cavity walls and extend outward to cylindrical peripheral bearing surfaces 86. Each of the angular piston cavity barrels 76 further includes annular end bearing surfaces 87 (FIGS. 1A and 2) and inner peripheral surfaces 88.

The annular piston cavity barrels 76, 77 are supported for rotation about the pump axis by supporting barrel carriers 92 and 93 respectively. The barrel carriers 92 and 93 are somewhat cup shaped and include cylindrical inner side bearing walls 94 (FIG. 4) that are complementary to the cylindrical peripheral surfaces 86 of the barrels 76, 77. Each of the barrel carriers 92, 93 includes an annular inner end bearing wall 95 (FIGS. 1A and 2) that is complementary to the end bearing surface 87. Bearing members 97 are mounted between the annular inner end bearing wall 95 of barrel carriers 92 and the end bearing surfaces 87 of the annular piston cavity barrels 76, 77 for permitting the barrels 76, 77 to freely rotate with respect to the barrel carriers about the pump axis. The bearing member 97 is preferably formed of a high density low friction plastic material. Alternatively, roller needle bearings may be provided if desired.

Each of the barrel carriers 92 and 93 are mounted stationarily within the housing 11 to prevent rotational movement of the barrel carriers 92, 93 with respect to the pump axis. Each of the barrel carriers 92, 93 include trunnion elements 100 and 101 (FIGS. 2 and 4) that extend outwardly at diametrically opposed locations for rotational support in respective housing bearing means 102 and 103. The trunnion elements 100 and 101 permit the barrel carriers 92 and 93 to be pivoted about tilt axes 105 and 106 respectively in which the tilt axes 105 and 106 intersect the pump axis. The tilt axes 105 and 106 are normal to the pump axis. Consequently the barrel carriers 92, 93 are capable of tilting the annular piston cavity barrels 76, 77 from normal orientations illustrated in FIG. 1 to maximum displacement orientations illustrated in FIGS. 10-13. In the orientation illustrated in FIG. 1A there is no fluid displacement from the pump 22 and the pump 22 is essentially free-wheeling. As the barrel carriers 92 and 93 are pivoted with respect to the tilt axes 105, 106 from the neutral orientation, the pump 22 begins to progressively displace fluid from the pump with the magnitude of fluid discharge or displacement upon the angular orientation of the barrels 76, 77 with respect to the pump axis. Maximum displacement is obtained at the maximum tilt angles illustrated in FIGS. 11-13.

Each of the barrel carriers 92 and 93 have pivot levers 108 and 109 (FIGS. 1A and 4) that extend from the barrel carriers outward to enable the barrel carriers 92 and 93 to be readily pivoted about the tilt axes 105 and 106 respectively.

Figure 5:
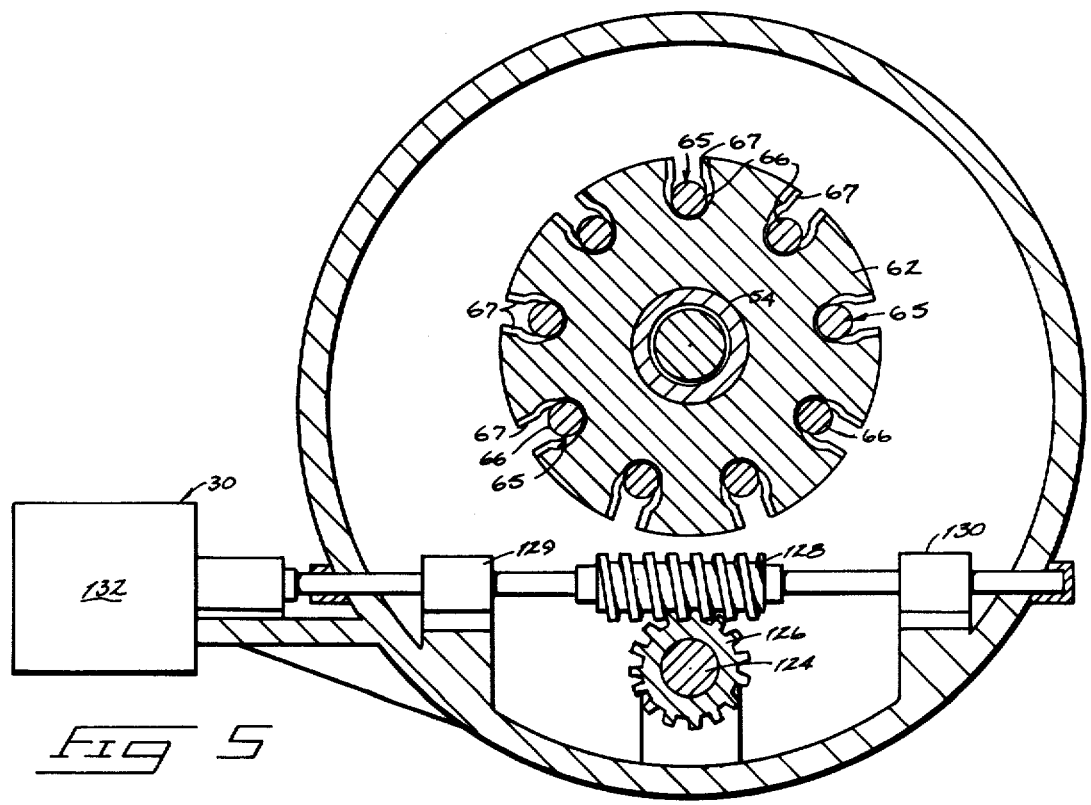
FIG. 5 is a transverse cross-sectional view taken along line 5—5 in FIG. 1A showing additional details of the fluid pump.

The control means 30 is illustrated in more detail in FIGS. 1A and FIG. 5. In a preferred embodiment the control means includes a first lead screw 112 supported between bearing blocks 113 and 114 with a lead screw nut 116 supported on the lead screw 112 for moving axially in response to the rotation of the lead screw 112. The lead screw nut 116 is operatively connected to the pivot lever 108 so that as the lead screw nut 116 moves along the lead screw 112, the pivot lever 108 pivots the barrel carrier 92 and the corresponding barrel 76 about the tilt axis 105 to vary the volumetric displacement from the barrel 76.

The control means 30 further includes a lead screw 118 supported in bearing blocks 119 and 120 having a lead screw nut 122 supported thereon for moving axially in response to the rotation of the lead screw 118. The pivot lever 109 is connected to the lead screw nut 122 so as to pivot the barrel carrier 93 and the corresponding barrel 77 about the tilt axis 106 in response to the rotational movement of the lead screw 118. In the preferred embodiment both of the lead screws 112 and 118 are connected through a common shaft 124 so that the lead screws 112 and 118 rotate in unison. The threads on the lead screw 112 and lead screw 118 are in opposite directions to that rotation on the common shaft 124 causes the barrel carriers 92 and 93 to pivot in opposite directions with respect to the tilt axes 105 and 106. A worm wheel 126 is mounted on the common shaft 124 and is driven by a worm gear 128 (FIG. 5) supported in bearing blocks 129 and 130. In a preferred embodiment the control means 30 includes a control motor 132 connected to the worm gear 128 to rotate the worm gear 128 to pivot the barrel carriers 92 and 93 in unison in opposite directions about the tilt axes 105, 106 to vary the fluid displacement of the pump 22. The greater the angular orientation the more torque required to rotate the shaft 54. Resistive torque is applied to the shaft 54 to restrict the rotation of the sun gear 21 and thereby progressively decrease the gear reduction of the planetary gear set 16 in response to increased fluid displacement of the pump 22.

Figure 10:
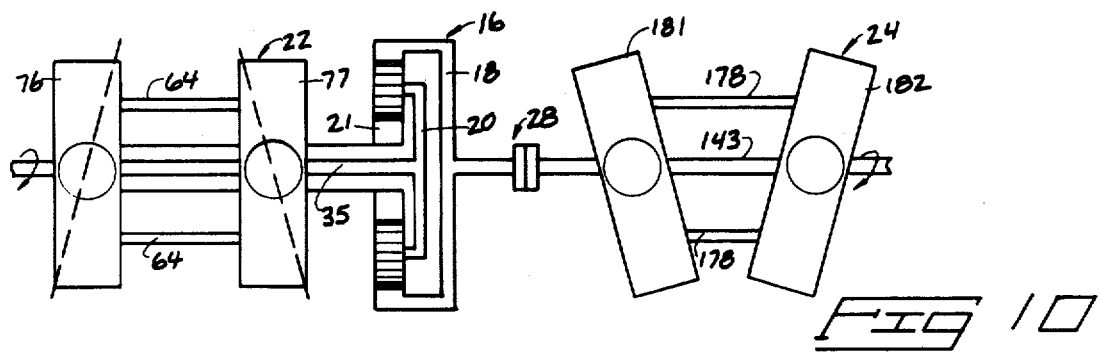
FIG. 10 is a diagrammatical sketch of the drive apparatus showing the apparatus in a forward mode condition proceeding from a zero displacement orientation shown in solid line to a maximum point displacement orientation shown in dotted line.
Figure 11:
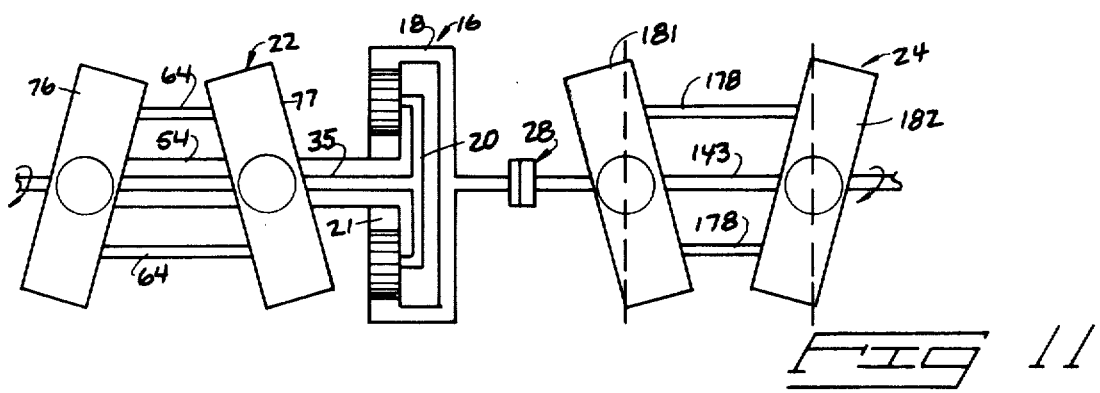
FIG. 11 is a diagrammatical sketch of the drive apparatus in the forward mode condition proceeding from a maximum motor displacement orientation illustrated in solid line to a zero motor displacement orientation illustrated in dotted line.

When the control motor 132 is operated to orient the barrels 76 and 77 in a parallel relationship there is zero or a very small fluid displacement from the pump 22. In such a condition, the pump 22 is substantially free wheeling and presents very little resistance to the rotation of the sun gear 21. In such a condition, the planetary gear system is at its maximum speed reduction. Upon activation of control motor 132, the orientation of the cavity barrels 76, 77 may be pivoted in either direction about the tilt axes 105 and 106. As illustrated in FIG. 10, the control motor 132 is being operated to progressively move the cavity barrels 76, 77 from a neutral parallel orientation to a maximum forward tilt orientation to provide maximum fluid displacement from the pump which in turn provides a progressive resistance to rotation of the shaft 54. Progressive decrease in the pump shaft speed causes progressive decrease in the speed of the sun gear 21. Reduction in the rotation of the sun gear 21 progressively decreases the speed ratio of the planetary gear set 16.

Figure 13:
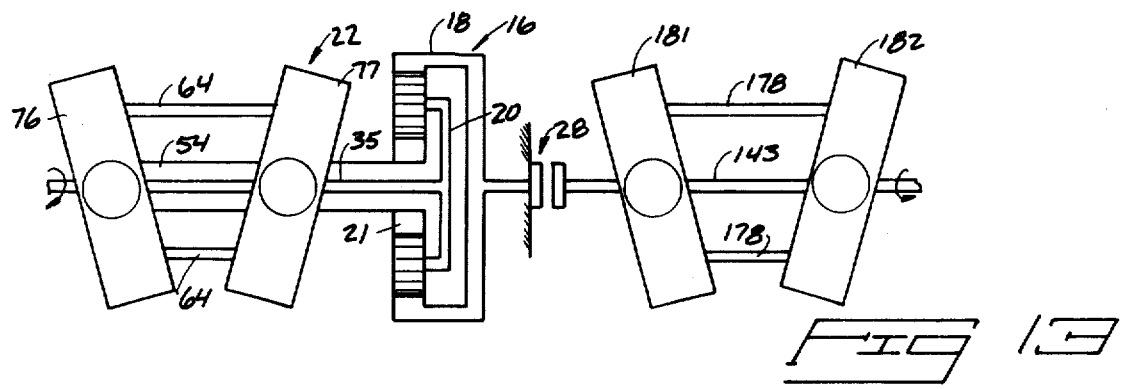
FIG. 13 is a diagrammatic sketch of the drive unit shown in the reverse mode condition.

As illustrated in FIG. 13, the control motor 132 may be operated in the opposite direction to tilt the cavity barrels 76, 77 in the opposite maximum direction to reverse the flow of the fluid from the pump to enable the drive apparatus to be operated in a reverse mode.

It should be noted that one of the advantages of this particular type of axial piston variable positive displacement pump 22 is that a substantial combined acute angle may be obtained at maximum displacement between the cavity barrels 76, 77 to provide a substantial resistive torque to the shaft 54. In one embodiment, each barrel 76, 77 is permitted to pivot from zero degrees to fifteen degrees. The combined maximum acute angle is thirty degrees.

It should be noted that the piston rods are double ended and are held axially stationary so that the compressive forces on the piston rods oppose each other, substantially cancelling any axial forces applied to the shaft 54. In such an arrangement, relatively small thrust bearings may be utilized and rather small sized shafts may be utilized which is not common to the conventional axial piston variable displacement pump. Additionally, it should be noted that the pump is capable of substantially doubling the fluid displacement per revolution as opposed to the conventional type axial piston variable displacement pump while still, at the same time, reducing the size of the components including the thrust bearings, shafts and other elements. Furthermore, it should be noted that a relatively small amount of mass is rotated about the shaft 54 to minimize centrifugal stresses. This enables the pump 22 to be operated at high speeds in the neighborhood of 12,000 to 14,000 rpms.

In this preferred embodiment, the power output drive means includes an output shaft 143 coaxial with respect to the input shaft 35 to provide an in line input-output shaft arrangement. The output shaft 143 extends from an inner end 145 that is supported by thrust bearing 148 to an outer end 146 that extends outward from the housing end 33. The shaft end 146 is supported by a thrust bearing 148.

The clutch means 28 includes a mode selector 156 (FIGS. 1B, 7 and 8) that includes a sliding free floating spline ring gear 168. The ring spline gear 168 is adapted to engage and rotate with a peripheral spline gear 160 that is formed on a central section 140 of the ring gear member 18 (FIG. 1A). Additionally, the clutch means 28 includes a peripheral spline gear 161 mounted on the output shaft end 145. Additionally, the clutch means 28 includes a stationary spline gear 162 that is formed or connected integrally with the housing 11 as illustrated in FIG. 1B. Transition cone clutches 164 and 165 are positioned intermediate the spline gear 160 and the spline gears 161 and 162 respectively to provide for a smooth transition for the sliding ring spline gear 168 to move between the three operating modes.

Figure 7:
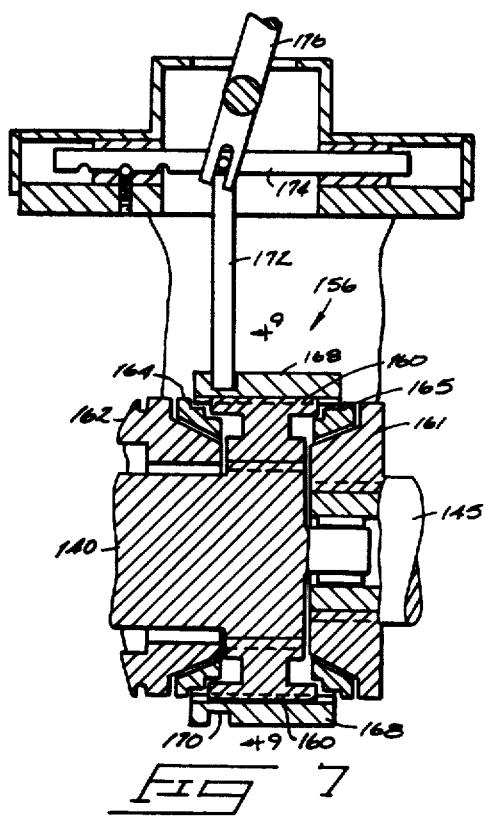
FIG. 7 is a longitudinal fragmentary enlarged cross-sectional view showing a part of FIG. 1B in which an operational mode device is shown in the neutral mode position.

The first operating mode is illustrated in FIG. 1B in which the ring spline gear 168 interconnects the spline gear 161 with the spline gear 160 to provide a direct mechanical connection between the ring gear member 18 and the output shaft 143. Such configuration may be referred to as the forward drive mode. A neutral operating mode is illustrated in FIG. 7 in which the sliding ring spline gear 168 is positioned centrally on the spline gear 160 without engaging either the spline gear 161 or the spline gear 162. A reverse operating mode is illustrated in FIG. 8 in which the ring spline gear 168 interconnects the spline gear 160 with the stationary spline gear 162 to freeze the ring gear member 18 and cause the sun gear to rotate in relation to the numerical teeth ratio of the set 16.

Figure 8:
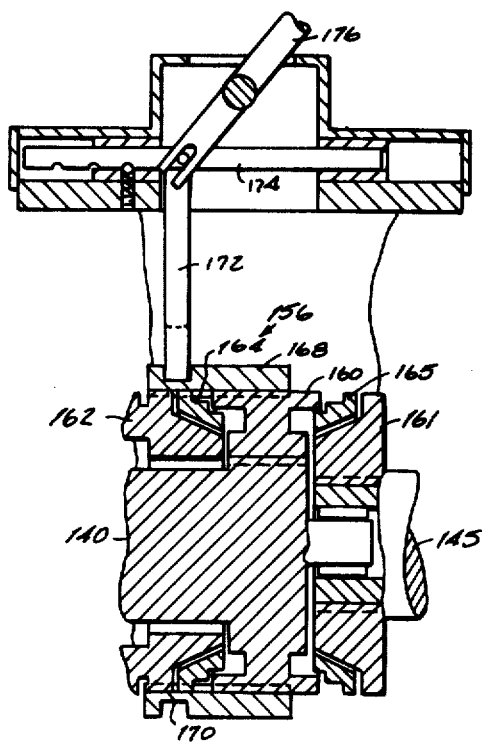
FIG. 8 is a longitudinal fragmentary cross-sectional view similar to FIG. 7 except showing the operational mode device in a reverse mode position.
Figure 9:
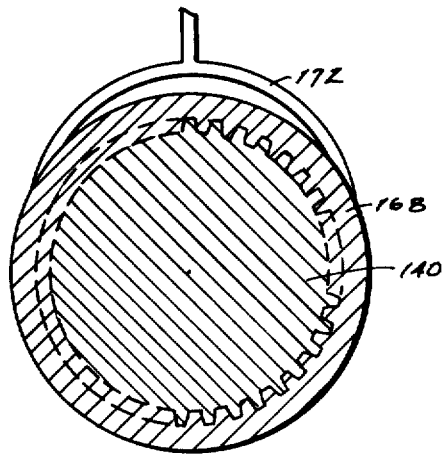
FIG. 9 is a transverse cross-sectional view taken along line 9—9 in FIG. 7 illustrating in more detail the operational mode device.

The sliding ring spline gear 168 has a peripheral groove 170 formed therein to receive a slider fork element 172 (FIG. 7) that is mounted to a sliding spool 174 (FIGS. 1B, 7 and 8). A mode shift lever 176 is connected to the spool 174 to slide the fork 172 to in turn slide the ring spline gear 168 to one of the three operating mode positions.

Turning now in detail to the motor 24, it should be noted that the motor 24 is almost structurally identical to the pump 22. In the embodiment shown the motor 24 has a shaft that is formed integrally with the output shaft 143. The motor 24 rotates about the axis of the shaft 143. The motor 24 includes a piston rod support 177 (FIGS. 1B and 3) that is affixed to the output shaft 143 and extends radially outward for supporting a plurality of double ended piston rods 178 at radially and angularly spaced positions about the shaft 143. Like the pump 22, the motor 24 has pistons that swivel on the ends of the piston rods 178 and are positioned within piston cavities formed in annular cavity barrels 181 and 182 respectively. (FIGS. 10-13). The barrels 181 and 182 are respectively rotatably supported by the barrel carriers 184 and 185 respectively for orbital movement about the motor shaft axis. The barrel carriers 184 and 185 are supported on trunnion elements for rotating the carriers 184, 185 and their respective barrels 181, 182 about tilt axes 186 and 187 respectively.

Pivot levers 190 and 191 (FIG. 1B) are connected to the barrel carriers 184 and 185 respectively for pivoting the barrel carriers 184, 185. The control means 30 further includes a lead screw 195 mounted between bearing blocks 193 and 194. A lead screw nut 196 is mounted on the lead screw 195 for moving axially along the lead screw in response to the rotation of the lead screw 195. The pivot lever 190 is connected to the lead screw nut 196 to pivot the barrel carrier 184 and corresponding barrel 181 about the tilt axis 186 in response to rotation of the lead screw 195. The control means 30 includes a lead screw 198 supported by bearing blocks 199 and 200. A lead screw nut 202 is mounted on the lead screw 198 for axial movement along the lead screw 198 in response to rotational movement of the lead screw 198. A common shaft 204 interconnects the lead screws 195 and 198 to rotate the lead screws in unison. The lead screws 195 and 198 have opposite threads so as to pivot the barrel carriers 184, 185 in opposite pivotal directions about the tilt axes 186, 187. A worm wheel 206 is mounted on the common shaft 204 and is driven by a worm gear 208. The worm gear 208 is driven by a motor (not shown) similar to control motor 132 for rotating the worm gear 208. The control motors may be operated independently of each other, sequentially to each other, or may be operated synchronously with each other to pivot the barrel carriers 92, 93, 184 and 185 about their respective tilt axes to vary the fluid displacement of the pump 22 and the motor 24.

The fluid interconnecting means 26 includes passageways 216 (FIGS. 2 and 4) that operatively interconnect the piston cavity ports in the pump 22 and motor 24. Both the pump 22 and motor 24 have a high pressure manifold 218 and a low pressure manifold 220. The manifolds selectively communicate with the piston cavity ports as the barrels 76,77, 181 and 182 rotate about their respective axes.

High pressure cavities 222 extend from the high pressure manifolds 218 outward through the barrel carriers 92,93, 184 and 185, and through their respective trunnions to a high pressure channel 226 that interconnects the high pressure manifolds 218 of the pump 22 and of the motor 24. Likewise low pressure cavities 223 interconnect the low pressure manifold 220 and extend outward through their respective manifolds to a low pressure channel 227 that may be thought of as a return channel between the motor and the pump. Although the manifolds 218 and 220 are referred to as high and low pressure manifolds respectively, it should be understood that when the orientation of the barrels 181, 182 is reversed that the fluid flow is additionally reversed and their functions are additionally reversed.

The fluid interconnecting means 26 further includes a fluid make up system 230 for adding fluid to the fluid system when needed. The fluid make up system 230 includes a fluid reservoir 231 that is connected to a pump 232. Pressure sensitive valves 233 are provided to emit additional fluid into the otherwise closed fluid circuit upon demand.

The operation of the fluid-mechanical drive apparatus will be briefly described with reference to FIGS. 10-13. FIG. 10 illustrates the drive unit in the start up forward operating mode with clutch member 28 having ring spline gear 168 in engagement with the spline gears 160 and 161 to mechanically interconnect the ring gear member 18 with the output shaft 143. The pump barrels 76, 77 are shown in the parallel non-displacement orientation permitting the sun gear 21 to be substantially free wheeling with very little if any torque applied to the shaft 54 to retard the sun gear 21. In such a condition no hydraulic fluid is pumped from the positive displacement pump 22 to the hydraulic motor 24. The fluid motor 24 is shown oriented at the maximum displacement orientation for applying maximum torque to the output shaft 143.

Assume that the drive apparatus 10 is utilized in a vehicle. The control means 30 would progressively pivot the pump cavity barrels 76 and 77 from the solid line towards the dotted line orientation to progressively increase the pump displacement. At a shallow displacement angle the pump will be rotating at a very high rpm providing a very high pressure output through the hydraulic interconnecting means 26 from the high pressure manifold 218 of the pump to the high pressure manifold of the motor. In one application the pressure rapidly increases to approximately 4000 psi which was communicated to the motor 24. The motor 24 then applies a very large torque to the output shaft 143 to overcome the initial start up inertia of the automobile. Additionally, a resistive torque of the pump 22 is applied to the pump shaft 54 to gradually reduce the speed of the sun gear 21. As the control means 30 continues to progressively pivot the cavity barrels 76 and 77 from their neutral positions towards their maximum displacement positions larger volumes of liquid are pumped from the positive displacement pump 22 to the positive displacement motor 24 to cause the output shaft 143 to rotate at a faster speed. Additionally, the resistive torque on the shaft 54 will progressively increase with the increased angle of displacement of the barrel carriers 76 and 77 to further resist the rotation of the shaft 54 and decrease the speed of the sun gear 21 which would in turn progressively decrease the gear reduction of the planetary set 16. During such a sequence there is a fluid or hydraulic interconnection between the power input drive means 12 and the power output drive means 14 and a mechanical interconnection between the output-input drive means 12 and the output drive means 14 to provide a dual system drive. After the control means 30 has moved the cavity barrels 76, 77 of the pump to the maximum displacement, control means 30 then begins to cause the control motor for the motor 24 to pivot the barrels 181 and 182 about their respective tilt axes 186 and 187 respectively from maximum tilt angles (solid line) toward neutral orientation (dotted line). As the barrels 181 and 182 progressively pivot from their maximum displacement orientations towards their neutral orientations shown in dotted lines the amount of hydraulic fluid passing between the pump 22 and the motor 24 progressively decreases. Such progressive decrease causes a progressive increase in the resistance of the pump 22 to rotation. This in turn decreases the rotation of the sun gear 21 and reduces the gear reduction ratio of the planetary gear set. When the barrels 181 and 182 are pivoted to their neutral positions, the motor 24 effectively stops the flow of hydraulic fluid between the pump and the motor to freeze the pump from rotating, thereby stopping the rotation of the shaft 54 and the sun gear 21. At such a condition, the planetary gear is in a full mechanical interconnection at the lowest speed reduction of the planetary gear. In one particular application, in which the ring gear 17 is connected to the output shaft and the planetary carrier member 20 is connected to the input shaft, one obtains an overdrive condition in which the output speed is greater than the input speed. It should be noted that in such a condition, in which the barrels 181 and 182 of the pump are in parallel or non-displacement orientations, no hydraulic torque is applied to the output shaft. Consequently, the drive apparatus has gone from an entirely hydraulic high torque drive from the initial start-up position shown in FIG. 10 to an entirely mechanical drive in FIG. 11 in which the drive efficiencies of the apparatus have remained high over the full range of speed ratio of the planetary gear set.

The control system 30 may be operated in conjunction with a tachometer on the input shaft in which it is desirable to maintain the input speed substantially constant. In many applications it is desirable to operate the prime mover at a substantially constant rpm of maximum efficiency. Various types of modes and control mechanisms may be utilized depending upon the application of the apparatus.

Figure 12:
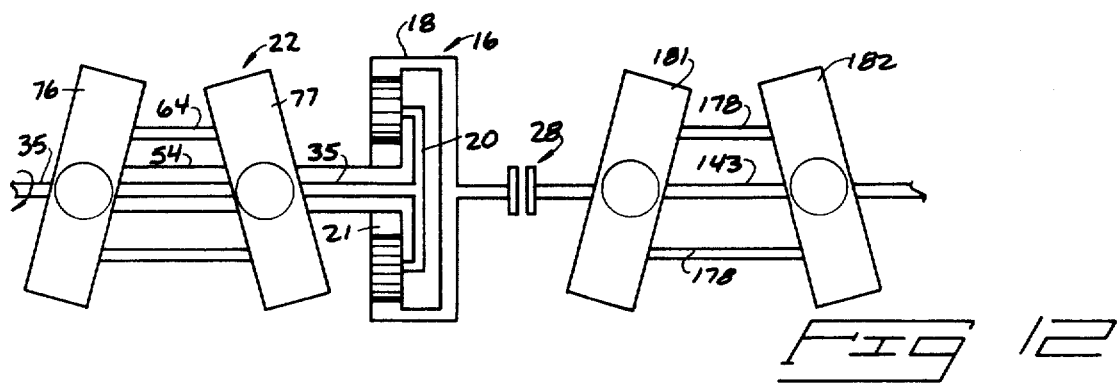
FIG. 12 is a diagrammatical sketch of the drive apparatus shown in the neutral mode condition.

With respect to the neutral operational mode, FIG. 12 illustrated the clutch means 28 in the neutral position with there being no mechanical interconnection between the ring gear member 18 and the output shaft 143. In such a condition the ring gear 17 is free wheeling enabling the sun gear to remain stationary without rotating the pump. Consequently, no torque is applied to the output shaft 143 and the drive apparatus remains in a neutral or non driving condition.

The reverse mode is illustrated in FIG. 13 in which the clutch means 28 is operated so that the sliding ring spline gear 168 is in engagement with the stationary spline gear 162 of the housing to effectively hold the ring gear 17 stationary. There is no mechanical interconnection between the planetary gear set 16 and the output shaft 143. However, the sun gear is caused to operate at a maximum planetary speed. The control means would then reverse the orientation of the pump barrels 76, 77 as shown in FIG. 13 to pump the liquid in an opposite direction through the low pressure cavity 227 to the low pressure manifold of the motor. The barrels 181 and 182 of the motor 24 would remain at the maximum displacement orientation to apply torque to the output shaft 143 to rotate the shaft 143 in the opposite direction. In the reverse operating mode, illustrated in FIG. 13, the drive apparatus 10 is operated in an entirely hydrostatic drive in which the entire torque applied to the output shaft 143 is through the hydraulic motor 24. There is no mechanical connection between planetary gear set 16 and the output shaft 143.

Although most of the discussion concerning the preferred embodiment relates to the utilization of non-compressible hydraulic oil, the drive apparatus may also be operated utilizing compressible fluid. However, for most applications, the non-compressible hydraulic fluid would be preferable.

It should be understood that the above described embodiment is simply illustrative of the principles of the invention and numerous other embodiments may be readily devised without deviating therefrom. Therefore, only the following claims are intended to define or limit this invention.

What is claimed is:

1. A variable ratio fluid-mechanical drive apparatus comprising:

a housing;

a planetary gear set mounted within the housing having a ring gear member, a planetary gear carrier member and a sun gear member with complementary ring gear, planetary gears and sun gear in intermeshing engagement for providing a wide range of speed ratios;

a power input drive means operatively connected to one of the planetary members for driving the planetary gear set;

a power output drive means operatively connected to one of the other planetary members to enable the planetary gear set to drive the power output drive means;

a positive displacement pump unit having a first unit shaft mounted within the housing for rotation about a pump unit axis in which the first shaft is operatively connected to the remaining planetary member to control the rotational speed of the remaining planetary member;

a positive displacement motor unit having a second unit shaft mounted within the housing for rotation about a motor unit axis in which the second shaft is operatively connected to the power output drive means to transfer torque between the second shaft and the power output drive means;

fluid connecting means operatively interconnecting the pump unit and the motor unit for communicating fluid between the pump unit and the motor unit;

wherein one of the positive displacement fluid units has:

(a) a plurality of piston rods extending axially in opposite directions with respect to the one unit shaft at radially and angularly spaced locations about the one unit shaft;

(b) means for maintaining the piston rods axially stationary with respect to the unit axis;

(c) each piston rod having axially stationary pistons mounted at respective rod ends;

(d) opposed piston cavity barrels mounted for orbital movement about the unit shaft and having a plurality of piston cavities receiving the pistons therein;

(e) barrel carrier means mounted within the housing rotatably supporting the cavity barrels for orbital movement about the one unit shaft and pivotally supporting the cavity barrels for pivotal movement about spaced tilt axes that are normal to and intersect with the one unit axis to orient the piston cavity barrels at varying orbital tilt angles about the tilt axes with respect to the unit axis; and first control means operatively connected to the barrel carrier means for pivoting the barrels in unison in opposite directions about the tilt axes to vary the tilt angles of the barrels to vary the fluid displacement of the one unit in relation to the magnitude of the tilt angles.

2. The variable ratio fluid-mechanical drive apparatus as defined in claim 1 wherein the pump unit axis and the motor unit axis are coincident with each other.

3. The variable ratio fluid-mechanical drive unit as defined in claim 1 wherein the other positive displacement unit includes:

(a) a plurality of piston rods extending axially in opposite directions with respect to the other unit shaft at radially and angularly spaced locations about the other unit shaft;

(b) means for maintaining the pistons axially stationary with respect to the other unit axis;

(c) each piston rod having axially stationary pistons mounted at respective rod ends;

(d) opposed piston cavity barrels mounted for orbital movement about the other unit shaft and having a plurality of piston cavities formed therein receiving the pistons; and (e) barrel carrier means mounted within the housing rotatably supporting the cavity barrels for orbital movement about the other unit shaft and pivotally supporting the piston cavity barrels for pivotal movement about spaced tilt axes that are normal to and intersect the other unit axis to orient the piston cavity barrels at varying orbital tilt orientations about the tilt axes with respect to the other unit axis; and (f) second control means operatively connected to the barrel carrier means for pivoting the barrels in unison in opposite directions about the tilt axis to vary the tilt angles of the barrels to vary the fluid displacement of the other unit in relation to the magnitude of the tilt angles.

4. The variable ratio fluid-mechanical drive unit as defined in claim 3 wherein the barrel carrier means of the other unit are capable of pivoting the opposing piston cavity barrels of the other unit about the tilt axes of the other unit between (a) neutral orientation positions in which the piston cavity barrels of the other unit are parallel with each other and normal with the other unit axis in which the fluid displacement is minimum and (b) maximum tilt orientation positions at acute angles with respect to the other unit axis in which the fluid displacement is maximum and wherein the second control means is operatively connected to the barrel carrier means of the other unit for pivoting the opposed piston cavity barrels of the other unit in unison about the tilt axes between the neutral orientation positions and the maximum tilt orientation positions to progressively vary the torque applied to the power output drive means.

5. The variable ratio fluid-mechanical drive apparatus as defined in claim 1 wherein the power input drive means includes an input drive shaft operatively connected to the one planetary member for driving the planetary gear set and wherein the pump unit shaft is tubular and is concentrically mounted about the input drive shaft and is operatively connected to the remaining planetary member.

6. The variable ratio fluid-mechanical drive unit as defined in claim 1 wherein the power output drive means includes an output drive shaft that is coaxial with the motor unit shaft.

7. The variable ratio fluid-mechanical drive unit as defined in claim 6 wherein the motor unit shaft and the output drive shaft are formed integral with each other.

8. The variable ratio fluid-mechanical drive unit as defined in claim 1 wherein the pump unit shaft is operatively connected to the sun gear member.

9. The variable ratio fluid-mechanical drive unit as defined in claim 1 wherein the barrel carrier means are capable of pivoting the piston cavity barrels about the tilt axes between (a) neutral orientation positions in which the piston cavity barrels are parallel with each other and normal with the one unit axis in which the fluid displacement of the one unit is minimum and (b) maximum tilt orientation positions in either pivot direction about the tilt axes with respect to the one unit axis in which the fluid displacement is maximum and wherein the first control means is operatively connected to the barrel carrier means for pivoting the opposed piston cavity barrels in unison about the tilt axes between the neutral orientation positions and the maximum tilt orientation positions to progressively vary the fluid displacement of the one unit and progressively vary the speed ratio of the planetary gear set.

10. The variable ratio fluid-mechanical drive means as defined in claim 1 wherein the positive displacement pump unit has a maximum pump torque value and wherein the positive displacement motor has a maximum motor torque value that is greater than the maximum pump torque value.

11. The variable ratio fluid-mechanical drive unit of claim 1 further comprises operational mode means having clutch means operatively intermediate the planetary gear set and the power output drive means for operatively mechanically interconnecting and operatively mechanically disconnecting one of the other planetary members and the power output drive means to respectively drive the power output drive means in one rotational direction and to discontinue driving the power output drive means in the one rotational direction.

12. The variable ratio fluid-mechanical drive unit as defined in claim 11 wherein the clutch means is operatively intermediate the planetary gear set and the housing for operatively hydrostatically interconnecting and operatively hydrostatically disconnecting one of the other planetary members and the housing to respectively hydrostatically drive the power output drive means in the other rotational direction and to discontinue hydrostatically driving the power output drive means in the other rotational direction.

* * * * *